United States Patent [19]
Shaffer et al.

[11] Patent Number: 5,866,665
[45] Date of Patent: Feb. 2, 1999

[54] COPOLYMERS OF ETHYLENE AND GERMINALLY DISUBSTITUTED OLEFINS

[75] Inventors: Timothy Daniel Shaffer, Houston; Jo Ann Marie Canich, Webster; Kevin Richard Squire, Kingwood, all of Tex.

[73] Assignee: Exxon Chemical Patents, Inc., Baytown, Tex.

[21] Appl. No.: 959,040

[22] Filed: Oct. 28, 1997

Related U.S. Application Data

[62] Division of Ser. No. 651,030, May 21, 1996, Pat. No. 5,763,556.

[51] Int. Cl.$^6$ .................................................. C08F 210/10
[52] U.S. Cl. ............... 526/348.4; 526/279; 526/281; 526/282; 526/285; 526/308; 526/347; 526/348.2; 526/348.3; 526/348.5; 526/348.6; 526/348.7; 526/916
[58] Field of Search .................................. 526/308, 347, 526/348.2, 348.6, 348.7, 279, 916, 348.4, 348.3, 345.5, 281, 282, 285

[56] References Cited

U.S. PATENT DOCUMENTS

| | | |
|---|---|---|
| 3,013,002 | 12/1961 | Breslow et al. . |
| 3,058,963 | 10/1962 | Vandenberg ................ 526/169.2 X |
| 3,481,908 | 12/1969 | Mortimer . |
| 3,645,992 | 2/1972 | Elston ................ 526/169.2 |
| 4,883,853 | 11/1989 | Hobes et al. . |
| 5,041,584 | 8/1991 | Crapo . |
| 5,374,696 | 12/1994 | Rosen et al. . |
| 5,414,040 | 5/1995 | McKay et al. . |
| 5,444,145 | 8/1995 | Brant et al. . |
| 5,448,001 | 9/1995 | Baird . |
| 5,475,075 | 12/1995 | Brant . |

FOREIGN PATENT DOCUMENTS

| | | |
|---|---|---|
| 729279 | 3/1966 | Canada ................ 526/347 |
| 0 099 646 A1 | 2/1984 | European Pat. Off. . |
| 94 183 E | 7/1969 | France . |
| 34 44 111 A | 6/1986 | Germany . |
| 0 497 643 | 12/1938 | United Kingdom . |
| WO 95/29940 | 11/1995 | WIPO . |

OTHER PUBLICATIONS

"Isotactic Polymerization of Olefins with Homogeneous Zirconium Catalysts," W. Kaminsky, et al, Transition Metals and Organometallics as Catalysts for Olefin Polymerization, W. Kaminsky, H. Sinn Eds., Springer Verlag, Berlin, 1988 p. 291.

"Carbocationic Polymerization of Olefins: A Critical Inventory," p. 53 et seq. J. Wiley & Sons 1975.

"Insertion Polymerization," Encycl. of Polm. Sci. and Eng., vol. 8, p. 175 Wiley Interscience 1988.

"Isomerization Polymerization of 3–Methyl–1–butene and 4–Methyl–1–pentene," Advances in Polymer Science, Kennedy and Johnson, pp. 58–95 (1975).

"Patent Abstracts of Japan" vol. 6, No. 63 (C–099), Apr. 22, 1982 and JP 57 003804 (Mitsui Petrolchemical Industries, Ltd.), Jan. 9, 1982.

"Chemical Abstracts," vol. 105, No. 2, Jul. 14, 1986, Columbus, Ohio, US; abstract No. 7001, Zhang, Y, et al.: Tetrafluorethylene and ethylene terpolymeres XP002039969 see abstract & CN 8 510 056 A (Shanghai Institute of Organic Chemistry) Oct. 9, 1985.

W. Kaminsky, H. Sinn: "Transition Metals and Organometallics as Catalysts for Olefin Polymerization" 1988, Springer Verlag, Berlin, XP002039968 cited in application see pp. 291–301.

"Modified Methylaluminoxane$^a$, Type 4 (MMAO–4) Toluene Solution," AKZO Chemicals, Inc.

"Modified Methylaluminoxane$^a$, Type 3 (MMAO–3A) Heptane Solution," AKZO Chemicals, Inc.

*Primary Examiner*—Fred Teskin
*Attorney, Agent, or Firm*—W. G. Muller

[57] ABSTRACT

Substantially random ethylene copolymers containing at least 3.0 mole percent of geminally disubstituted olefin monomers are described. The geminally disubstituted olefin monomers can be represented by the generic formula $R_1=R_2(R_3)(R_4)$, where $R_1$ is $CH_2$, $R_2$ is C, and $R_3$ and $R_4$ are, independently, essentially linear hydrocarbyl groups having from 1 to 30 carbon atoms, or more, and containing one carbon atom bound directly to $R_2$. The copolymers can be prepared by coordination polymerization by means of contacting at least one geminally disubstituted olefin monomer and ethylene, optionally with one or more other coordination polymerizable monomers, with a catalyst system comprising a monocyclopentadienyl, heteroatom-containing Group 4 transition metal catalyst component.

11 Claims, 2 Drawing Sheets

COPOLYMERS OF ETHYLENE AND GERMINALLY DISUBSTITUTED OLEFINS

This is a divisional of application Ser. No. 08/651,030, filed 21 May 1996, now U.S. Pat. No. 5,763,556.

FIELD OF THE INVENTION

The present invention relates to ethylene copolymers containing at least one species of seminally disubstituted olefin monomers and a polymerization process for preparing them. More particularly, the invention is directed to a process for copolymerizing ethylene and geminally disubstituted olefin monomers in the presence of a monocyclopentadienyl metallocene catalyst component, and the copolymers from it.

BACKGROUND OF THE INVENTION

Insertion, or coordination, polymerization is a well-known chemical reaction sequence for preparing polymers and copolymers of ethylene, α-olefins, non-conjugated diolefins and strained ring cyclic olefins. And, in particular, coordination polymerization with monocyclopentadienyl metallocene catalyst systems is now well-known. Traditional Ziegler monomers, e.g., ethylene and α-olefins, such as propylene, 1-butene, 1-hexene, and 1-octene, are readily polymerized in the presence of Group 4 transition metals having as ligands one η-5 bound cydopentadienyl ligand and three σ-bound monoanionic ligands, preferably where one of the monoanionic ligands comprises a heteroatom that is covalently bound both to the Group 4 metal center and, through a bridging group, to a ring carbon atom of the cydopentadienyl ligand group.

Geminally disubstituted olefin monomers, such as isobutylene, are known not to be readily polymerizable by insertion, or coordination, mechanisms. In the chapter on "Insertion Polymerization", *Encycl. of Polm. Sci. and Eng.,* vol. 8, p. 175 (Wiley Interscience, 1988), the statement is made that ". . . 1,1-disubstituted α-olefins are neither homo- nor copolymerized with other monoolefins." Instead such disubstituted αolefins are typically polymerized and copolymerized by cationic or carbocationic polymerization with Lewis acid catalyst systems known to initiate the formation of carbocations. However, since ethylene is not readily polymerized by cationic techniques, see Kennedy, J. P., *Carbocationic Polymerization of Olefins: A Critical Inventory,* p. 53 et seq. (John Wiley & Sons, 1975), ethylene copolymers with disubstituted α-olefns are largely unknown.

In Kennedy and Johnston, Isomerization Polymerization of 3-Methyl-1-butene and 4-Methyl-1-pentene, *Advances in Polymer Science,* p. 58–95 (1975), it was stated to be of interest to examine the cationic isomerization polymerization of 4-methyl-1-pentene because the completely isomerized structure can be viewed as a perfectly alternating copolymer ethylene and isobutylene. A structure which, in the reporters' words, "cannot be synthesized by conventional techniques", page 61. Due to multiple isomerization reactions occurring under the cationic isomerization polymerization reactions the sought alternating ethylene-isobutylene was observed, in amounts only up to 55 mol. % —($CH_2$—$CH_2$—$CH_2$—$C(CH_3)_2$)— with the remainder consisting of the 1,2 addition product —($CH_2CH(CH_2CH(CH_3)_2)$)— and the 1,3 addition product —($CH_2CH_2CH(CH(CH_3)_2)$)—. The 1,3-addition product is only possible using the cationic chemistries disclosed in the reference and is incompatible with insertion polymerization.

The use of both biscyclopentadienyl and monocyclopentadienyl metallocene catalyst systems for combined carbocationic and coordination polymerization of mixed feeds of ethylene and isobutylene at temperatures below 20° C. is described in WO 95/29940. Copolymerization of ethylene and isobutylene is said to be enabled by use of the described catalyst systems, in particular, sequential feeding of each monomer is said to enable blocky copolymers of polyisobutylene-co-polyethylene. Example E describes ethylene/isobutylene copolymerization concurrent with the homopolymerization of both the isobutylene and the ethylene at –20° C. with bis-(cyclopentadienyl)hafnium dimethyl and bis-(pentamethylcyclopentadienyl)-zirconium dimethyl, both activated by triphenylmethyl-tetrakis(perfluorophenyl) boron. The amount produced of ethylene-isobutylene copolymer was less than 1.3 weight % of the total polymer products. Copolymerization of 2-methylpropene (isobutylene) and ethylene at 30° C. and 50° C. with ethylene-bis(indenyl)zirconium dichloride when activated with methylalumoxane was reported in "Isotactic Polymerization of Olefins with Homogeneous Zirconium Catalysts", W. Kaminsky, et al, *Transition Metals and Organometallics as Catalysts for Olefin Polymerization,* page 291, 296 (Springer-Verlag, 1988). Incorporation of isobutylene was reported to be less than 2.8 mol. %, the only example illustrates 1.35 mol. %.

In view of the above, additional means of manufacturing polyolefins, particularly a means of incorporating geminally disubstituted α-olefins in such polyolefins is highly desirable. Copolymer compositions comprising ethylene and geminally disubstituted olefins, optionally with other polymerizable olefinically-unsaturated monomers, would provide new compositions useful in many applications and would serve the function of economically utilizing the inherent feedstock make-up in petroleum refining processes.

Invention Disclosure

The invention comprises substantially random ethylene copolymers derived from ethylene and at least one geminally disubstituted olefin monomer comprising more than 3.0 mole percent of the geminally disubstituted olefin monomer. It further comprises a process for the preparation of the copolymers comprising contacting the at least one geminally disubstituted olefin monomer and ethylene, optionally with one or more other coordination polymerizable monomers, with a catalyst system comprising a monocyclopentadienyl, heteroatom ligand-containing Group 4 transition metal catalyst component.

DESCRIPTION OF THE INVENTION AND EXAMPLES

Figure 1:
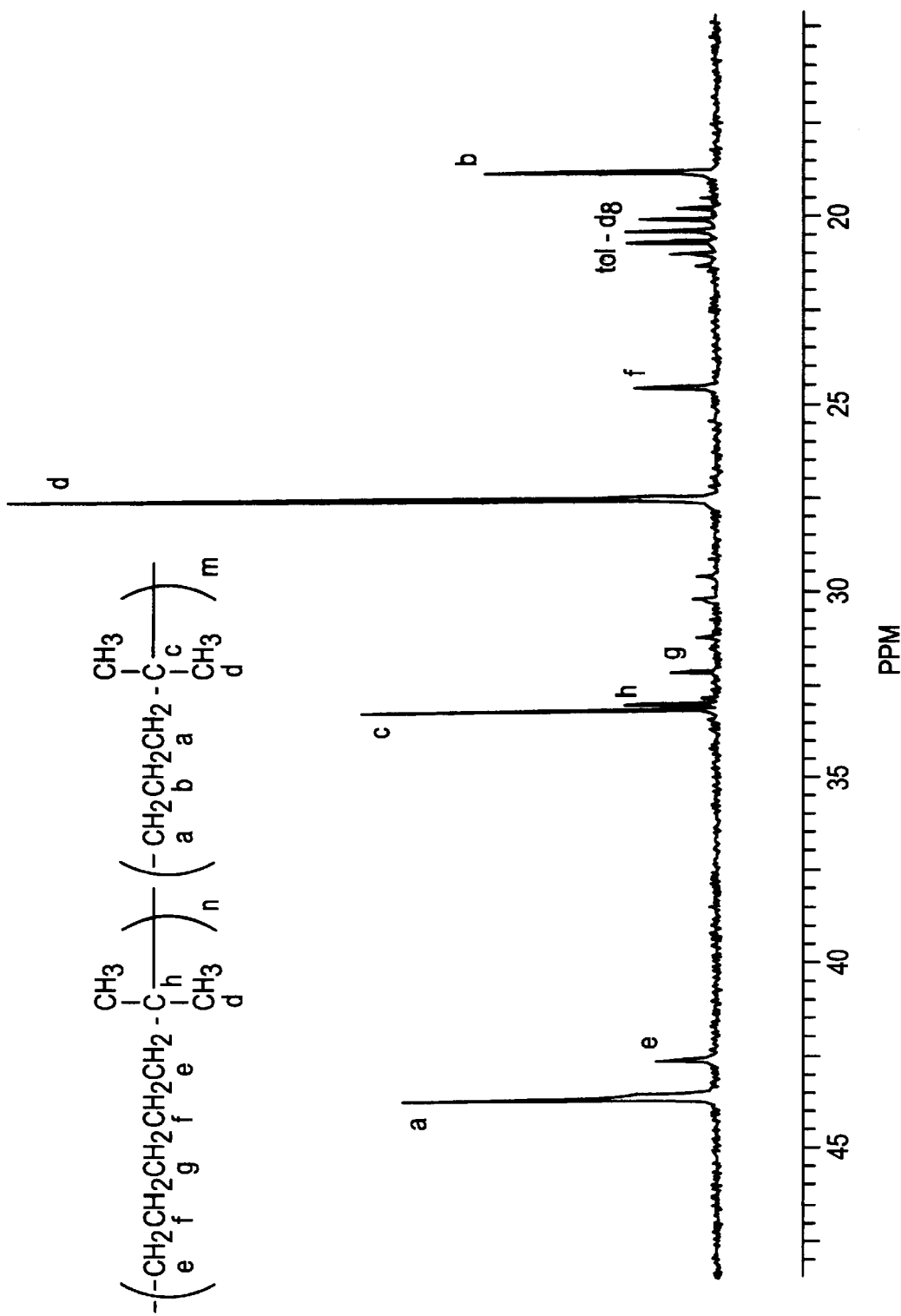
FIG. 1 is a $^{13}$C-NMR (62.5 MHz in tol-$_8$) spectrum of an ethylene-isobutylene copolymer of the invention (Example 14). Analysis of the spectrum confirmed a copolymer having segments (—$CH_2$—$CH_2$—$CH_2$—$CH_2$—$CH_2$—$C(CH_3)_2$—)$_n$ and segments (—$CH_2$—$CH_2$—$CH_2$—$C(CH_3)_2$—)$_m$ in respective amounts of 14 mol. % "n" segments and 85 mol. % "m" segments. No isobutylene diads, or higher homopolymerized isobutylene segments, are present.
Figure 2:
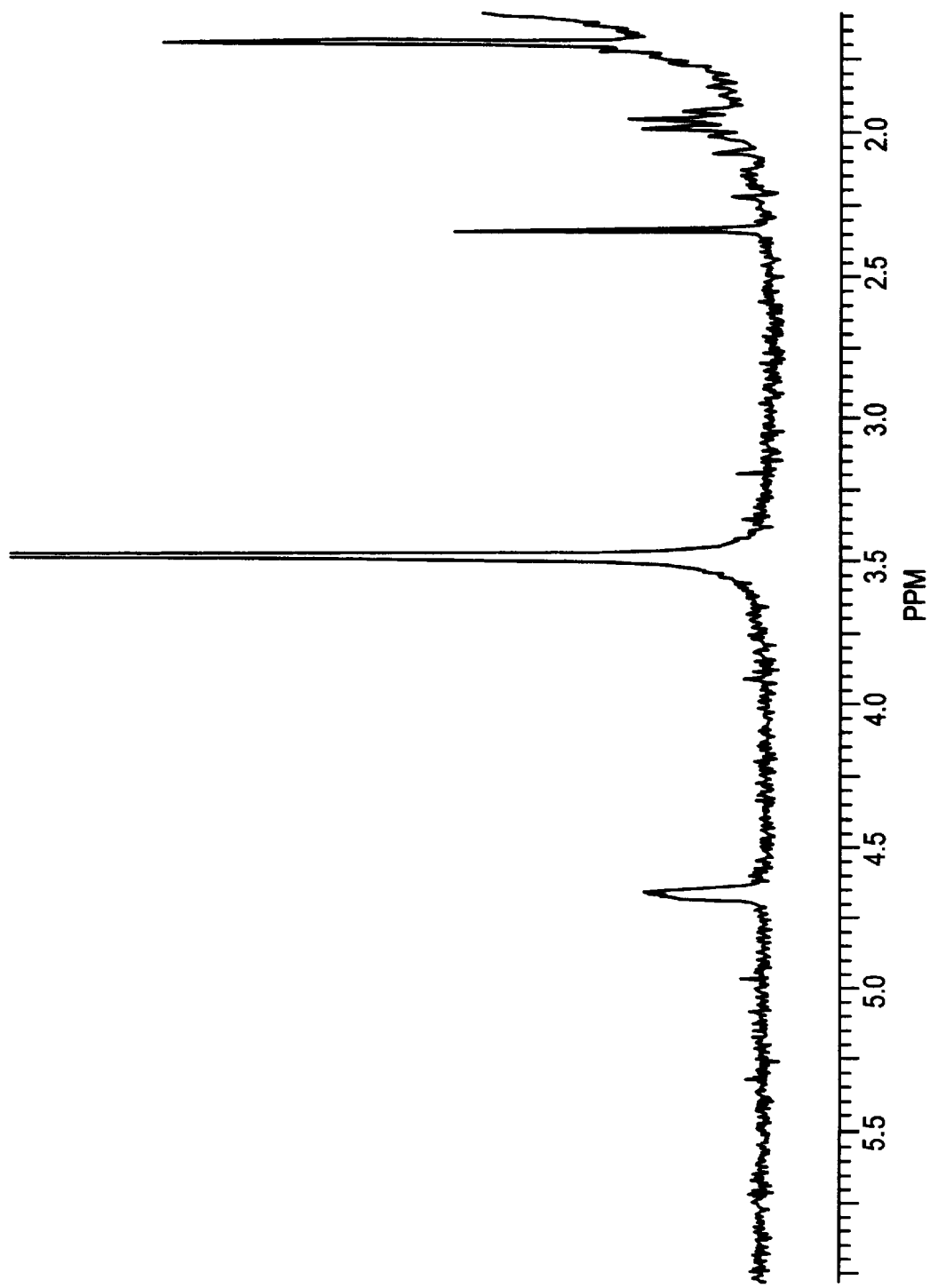
FIG. 2 is a $^1$H-NMR (250 MHz in CDCl$_3$) spectrum of another ethylene-isobutylene copolymer of the invention (Example 5). Analysis of the spectrum shown indicates that unsaturated chain-end termination consists solely of vinylidene groups.

The term "substantially random" when used to describe the ethylene copolymers of this invention means that the copolymer comprises (A) sequences of an alternating comonomer structure comprising ethylene and a geminally disubstituted olefin monomer randomly interrupted by (B) polyethylene sequences with the characterizing feature that at least one ethylene monomer will be incorporated between each incorporated geminally disubstituted olefin monomer. The copolymer may be represented as a copolymer comprising randomly incorporated —(E—G)$_n$— and —(E)$_b$— sequences where E represents a (—CH$_2$—CH$_2$—) unit derived from ethylene and G represents a (—CH$_2$—C(R$_3$)(R$_4$)—) unit derived from a geminally disubstituted monomer, R$_3$ and R$_4$ being essentially hydrocarbyl radicals as further defined below. The values of a and b are the respective mole fractions of each unit comprising the copolymer, where a+b=1. Thus "a" can be from below 0.03 to 1.00 and "b" can be from 0.00 to 0.97 and higher. Where isobutylene, for example, is available as the geminally disubstituted monomer in the reaction process in amounts permitting of high incorporation relative to the ethylene, approaching a 50/50 mol. % ratio, the value of "b" will approach zero and the polymer will approach a statistically alternating copolymer of ethylene and isobutylene.

The substantially random copolymers according to the invention may additionally comprise one or more coordination, or insertion, polymerizable monomers, said monomers being randomly incorporated in the E sequences. For example, a resulting terpolymer may be represented in one embodiment as a copolymer comprising randomly incorporated —(E—G)$_n$—, —(E)$_b$—, and —(T)$_c$ sequences where E and G are as described above, T is another coordination polymerizable monomer or macromer and "a", "b", and "c" are the respective mole fractions of each sequence comprising the terpolymer. In this embodiment "a" may have a value of 0.03 to 0.99 while the sum of "b" and "c" may have values of 0.01 to 0.97, provided that a+b+c=1. Tetrapolymers, etc., will be possible and each such copolymer will have the characteristic feature of comprising the —(E—G)$_a$— and —(E)$_b$— sequences, with other sequences depending upon the number of additional polymerizable monomers incorporated.

Geminally disubstituted olefin monomer incorporation in the invention copolymer will vary according to process conditions, particularly comonomer concentrations used in copolymerization but can achieve levels including the low levels taught in the prior art, e.g., from zero (in the absence of comonomer) to 1.3 or 2.8 mol. %, and can readily exceed those, e.g., 3.0 to about 50 mol. %. Amounts of from 4 to 45 mol. % are exemplified in this application and are representative. Depending upon the level of incorporated seminally disubstituted olefin monomer, or monomers, polymers ranging from crystalline to elastomeric can be prepared in accordance with the invention. Use of the term "elastomer" or "elastomeric" is meant in this application as recognized in the art, that is the copolymers are largely amorphous, they do not contain a significant amount of crystalline segments, for example not more than 15wt.%. A typical description of elastomeric ethylene-α-olefin copolymers with respect to crystallinity appears in co-pending application 08/545,973, filed Sep. 25, 1995, the teachings of which are incorporated by reference for purposes of U.S. patent practice. As will be apparent to one of skill in the art, disruption of any polyethylene crystalline structure, the E units, can also or additionally be achieved by the further incorporation of the other coordination polymerization monomers capable of copolymerization with the polymerization catalyst of the invention.

The copolymers of the invention will have high degree of terminal, chain-end unsaturation. Those copolymers of the invention having at least 5 mol. % of geminally disubstituted olefin monomer, will have predominantly vinylidene chain-end unsaturation. Here predominantly means at least 45 mol. % of the total unsaturated chain-ends.

The copolymers of the invention will have an $M_n$ (number-average molecular weight) value from about 300 to 300,000, preferably between from about 700 to 200,000, and more preferably less than 100,000. For low weight molecular weight applications, such as those copolymers useful in lubricating and fuel oil compositions, an $M_n$ of 300 to 20,000 is preferred, and more preferably less than or equal to 10,000.

Polymerization Process

The generic process for the preparation of the invention copolymers comprises contacting at least one geminally disubstituted olefin monomer and ethylene, optionally with one or more other coordination polymerizable monomers, with a catalyst system comprising a monocyclopentadienyl, heteroatom-containing Group 4 transition metal catalyst component. The contacting can be conducted by combining the activated catalyst composition with the polymerizable monomers under suitable coordination polymerization conditions. Preferably the catalyst component is one additionally comprising a Group 15 or 16 heteroatom covalently bound both to the Group 4 transition metal center and, through a bridging group, to a ring carbon of the cyclopentadienyl group-containing ligand. Such catalysts are well-known in the art, see, e.g., background U.S. Pat. Nos. 5,055,438, 5,096,867, 5,264,505, 5,408,017, 5,504,169 and WO 92/00333. See also, U.S. Pat. Nos. 5,374,696, 5,470, 993 and 5,494,874; and, see, international publications WO 93/19104 and EP 0 514 828 A. For cyclic olefin-containing copolymers, see WO-94/17113, copending U.S. Ser. No. 08/412,507, filed 29 Mar. 1995, U.S. Pat. No. 5,635,573 and copending application U.S. Ser. No. 08/487,255, filed Jun. 7, 1995, and published as WO 96/002444. Additionally, the unbridged monocyclopentadienyl, heteroatom-containing Group 4 transition metal catalyst components of copending U.S. patent application 08/545,973, filed Sep. 25, 1995, will be suitable in accordance with the invention. Each of the foregoing references are incorporated by reference for the purposes of U.S. patent practice.

Without intending to limit the invention, it is believed that a catalyst structure, exemplified and described in both the documents above and in the description and examples below, acts to allow ready polymerization of the geminally disubstituted olefins, but principally from the unhindered approaches to the metal coordination center and in a manner dictated by the steric constraints of the catalyst compound ligand system and the steric structure of the geminally disubstituted olefins. The bulk or steric structure of an inserted geminally disubstituted olefin and the steric constraints of the catalyst ligand system during insertion may act to inhibit entry into the coordination center of the catalyst of an immediately subsequent geminally disubstituted olefin monomer. Thus insertion of a subsequent geminally disubstituted olefin is generally preceded by the insertion of ethylene. The subsequent geminally disubstituted olefin is then not inhibited by the previously inserted ethylene and can readily enter and be inserted. A copolymer results having the described sequence segments containing those that are essentially of alternating G units. As an apparent result, the invention copolymer has an insignificant number of, that is essentially no, diads, triads, etc., comprising homopolymerized, or sequentially polymerized, geminally disubstituted olefins.

The optional coordination polymerizable monomers that may be incorporated in the substantially random ethylene copolymers will also be randomly incorporated at the beginning or within the E sequences of the invention copolymer.

The geminally disubstituted olefins useful in accordance with the invention include essentially any having the generic formula

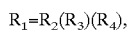

where $R_1$ is $CH_2$, $R_2$ is C, and $R_3$ and $R_4$ are, independently, essentially hydrocarbyl groups containing at least one carbon atom bound to $R_2$. Preferably $R_3$ and $R_4$ are linear, branched or cyclic, substituted or unsubstituted, hydrocarbyl groups having from 1 to 100 carbon atoms, preferably 30 or less carbon atoms, and optionally $R_3$ and $R_4$ are connected to form a cyclic structure. Thus the term geminally disubstituted olefins includes both monomers, such as isobutylene, and macromers having the representative structure above. Though $R_3$ and $R_4$ are to be essentially hydrocarbyl, the inclusion of non-hydrocarbyl atoms (such as O, S, N, P, Si, halogen etc.) is contemplated where such are sufficiently far removed from the double-bond so as not to interfere with the coordination polymerization reactions with the catalyst and so as to retain the essentially hydrocarbyl characteristic of being largely soluble in hydrocarbon solvents. The geminally substituted olefins specifically include isobutylene, 3-trimethylsilyl-2-methyl-1-propene, 2-methyl-1-butene, 2-methyl-1-pentene, 2-ethyl-1-pentene, 2-methyl-1-hexene, 2-methyl-1-heptene, 6-dimethylamino-2-methyl-1-hexene, α-methylstyrene and the like as representative compounds.

The optional coordination polymerizable monomers which may be copolymerized in accordance with the invention include one or more of: $C_3$ and higher α-olefins, styrene and hydrocarbyl-substituted styrene monomers wherein the substituent is on the aromatic ring, $C_6$ and higher substituted α-olefins, $C_4$ and higher internal olefins, $C_4$ and higher diolefins, $C_5$ and higher cyclic olefins and diolefins, and acetylenically unsaturated monomers. Preferred α-olefins include α-olefins having 3 to 30 carbon atoms, preferably 3 to 20 carbon atoms, but 1-olefin macromers having more than 30 carbon atoms, up to about 100 carbons atoms and more can similarly be used.

Preferred α-olefins thus include propylene, 1-butene, 1-pentene, 1-hexene, 1-heptene, 1-octene, 1-nonene, 1-decene, 1-dodecene, 4-methyl-1-pentene, 5-methyl-1-nonene, 3-methyl-1-pentene, 3,5,5-trimethyl-1-hexene, and vinylcyclohexane. Styrene and paramethylstyrene are preferred styrenic olefins. Preferred diolefins include those described in the literature for ethylene copolymers, specifically for EPDM rubber, the disclosure of copending application 08/545,973, above, is particularly relevant in this regard. Examples include straight chain acyclic diolefins, branched acyclic diolefins, single ring alicyclic diolefins, multi-ring alicyclic fused and bridged ring diolefins and cycloalkenyl-substituted alkenes. Preferred examples are 1,4-hexadiene, dicyclopentadiene, 5-ethylidene-2-norbornene, vinylcyclohexene and 5-vinyl-2-norbornene.

The $C_6$ and higher substituted α-olefins include those containing at least one Group 13 to 17 atom bound to a carbon atom of the substituted α-olefin. Examples include allyltrimethylsilane, 4,4,4-trifluoro-1-butene, methyl allyl ether, methyl allyl thiother, and dimethyl allyl amine. The use of functional group-containing α-olefins is also within the scope of the invention when such olefins can be incorporated in the same manner as are their α-olefin analogs. See, "Metallocene Catalysts and Borane Reagents in The Block/Graft Reactions of Polyolefins", T. C. Chung, et al, *Polym. Mater. Sci. Eng.*, v. 73, p. 463 (1995), and the masked α-olefin monomers of U.S. Pat. No. 5,153,282. Such monomers permit the preparation of both functional-group containing invention copolymers capable of subsequent derivatization and of functional macromers which can be used as graft and block type polymeric segments. All documents are incorporated by reference for purposes of U.S. patent practice.

Cyclic olefins capable of copolymerization in accordance with the invention include cyclopentene, norbornene, alkyl-substituted norbornenes, cyclohexene, cycloheptene and those further described in the background documents and patent literature, see WO-94/17113, copending U.S. Ser. No. 08/412,507, filed 29 Mar. 1995, and U.S. Pat. Nos. 5,270,393 and 5,324,801. These documents are as well incorporated by reference for purposes of U.S. patent practice.

For the copolymerization of geminally disubstituted olefins with ethylene, the preferred molar ratio of geminally disubstituted olefin to ethylene is from about 1000:1 to 1:1000, more preferably from about 500:1 to 1:20, even more preferably from 100:1 to 1:1. The optional coordination polymerizable monomers may be introduced in any ratio consistent with desired incorporation ratios.

The monocyclopentadienyl, heteroatom-containing Group 4 transition metal catalyst components of the invention are derived from the monocyclopentadienyl Group 4 metallocene compounds well-known and described in the documents listed above, and others in the patent literature. These compounds may be represented by the generic formula

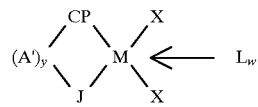

wherein:

M is Zr, Hf or Ti, preferably Ti;

Cp is a cyclopentadienyl ring which may be substituted with from zero to five substituted groups R when y is zero, and from one to four substituted groups R when y is one; and each substituted group R is, independently, a radical selected from hydrocarbyl, silyl-hydrocarbyl or germyl-hydrocarbyl having from 1 to 30 carbon, silicon or germanium atoms, substituted hydrocarbyl, silyl-hydrocarbyl or germyl-hydrocarbyl radicals as defined wherein one or more hydrogen atoms is replaced by a halogen radical, an amido radical, a phosphido radical, an alkoxy radical, an aryloxy radical or any other radical containing a Lewis acidic or basic functionality; $C_1$ to $C_{30}$ hydrocarbyl-substituted metalloid radicals wherein the metalloid is selected from the Group 14 of the Periodic Table of Elements; halogen radicals; amido radicals; phosphido radicals; alkoxy radicals; or alkylborido radicals; or, Cp is a cyclopentadienyl ring in which at least two adjacent R-groups are joined together and along with the carbon atoms to which they are attached form a $C_4$ to $C_{20}$ ring system which may be saturated, partially unsaturated or aromatic, and substituted or unsubstituted the substitutions being selected as one or more R group as defined above;

J is a Group 15 or 16 heteroatom which may be substituted with one R' group when J is a group 15 element, and y is one, or a group 16 element and y is zero, or with two R' groups when J is a group 15 element and y is zero, or is unsubstituted when J is Group 16 element and y is one; and each substituent group R' is, independently, a radical selected from: hydrocarbyl, silyl-hydrocarbyl or germyl-hydrocarbyl radicals having 1 to 30 carbon, silicon or germanium atoms; substituted hydrocarbyl, silyl-hydrocarbyl or germyl-hydrocarbyl radicals as defined wherein one or more hydrogen atoms is replaced by a halogen radical, an amido radical, a phosphido radical, an alkoxy radical, or an aryloxy radical; halogen radicals; amido radicals; phosphido radicals; alkoxy radicals; or alkylborido radicals;

each X is independently a monoanionic ligand selected from hydride; substituted or unsubstituted $C_1$ to $C_{30}$ hydrocarbyl; alkoxide; aryloxide; amide; halide or phosphide; Group 14 organometalloids; or both X's together may form an alkylidene or a cyclometallated hydrocarbyl or any other dianionic ligand;

y is 0 or 1; and when y=1,

A' is a bridging group covalently bonded to both Cp and J, typically comprising at least one Group 13, 14 or 15 element such as carbon, silicon, boron, germanium, nitrogen or phosphorous with additional substituents R as defined above so as to complete the valency of the Group 13, 14 or 15 element(s);

L is a neutral Lewis base other than water, such as an olefin, diolefin, aryne, amine, phosphine, ether or sulfide, e.g., diethylether, tetrahydrofuran, dimethylaniline, aniline, trimethylphosphine, n-butylamine, and the like; and, w is a number from 0 to 3.

Preferred compounds include: dimethylsilyl (tetramethylcyclopentadienyl)(cyclododecylamido)titanium dichloride, dimethylsilyl(tetramethylydopentadienyl) cycldodecyloamido)titanium dimethyl, dimethylsily (tetramethylcydopentadienyl)(1-adamantylamido)titanium dichloride, dimethylsilyl(tetra-methylcyclo-pentadienyl)(1-adamantylamido)titanium dimethyl, dimethylsilyl (tetramethylcydopentadienyl)(t-butylamido)titanium dichloride, dimethylsilyl(tetramethylcyclopentadienyl)(t-butylamido)titanium dimethyl. The zirconium and hafnium analogs to the above compounds will also be preferred, but the titanium versions are more highly preferred.

Additionally, such compounds include the dimeric species that result from dimerizing two of the monocyclopentadienyl, heteroatom-containing Group 4 transition metal catalyst compounds described, as is well known and described in the documents above.

The term "cyclopentadienyl" refers to a 5-member ring having delocalized bonding within the ring and typically being bound to M through $\eta^5$-bonds, carbon typically making up the majority of the 5-member positions.

The monocyclopentadienyl catalyst compounds according to the invention may be activated for polymerization catalysis in any manner sufficient to allow coordination polymerization. This can be achieved for example when one X ligand can be abstracted and the other X will either allow insertion of the unsaturated monomers or will be similarly abstractable for replacement with an X that allows insertion of the unsaturated monomer. The traditional activators of metallocene polymerization art are suitable, those typically include Lewis acids such as alumoxane compounds, and ionizing, anion pre-cursor compounds that abstract one X so as ionize the transition metal center into a cation and provide a counter-balancing, compatible, noncoordinating anion.

Alkylalumoxanes and modified alkylalumoxanes are suitable as catalyst activators, particularly for the invention metal compounds comprising halide ligands. The alumoxane component useful as catalyst activator typically is an oligomeric aluminum compound represented by the general formula $(R"-Al-O)_n$, which is a cyclic compound, or $R"(R"-Al-O)_n AlR"_2$, which is a linear compound. In the general alumoxane formula R" is independently a $C_1$ to $C_{10}$ alkyl radical, for example, methyl, ethyl, propyl, butyl or pentyl and "n" is an integer from 1 to about 50. Most preferably, R" is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane. Methylalumoxane and modified methylalumoxanes are preferred. For further descriptions see, U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561476 A1, EP 0 279 586 B1, EP 0 516 476 A, EP 0 594 218 A1 and WO 94/10180, each being incorporated by reference for purposes of U.S. patent practice.

When the activator is an alumoxane, the preferred transition metal compound to activator molar ratio is from 1:2000 to 10:1, more preferably from about 1:500 to 10:1, even more preferably from about 1:250 to 1:1 and most preferably from about 1:100 to 1:1.

The term "noncoordinating anion" as used for the ionizing, anion pre-cursor compounds is recognized to mean an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex between the monocyclopentadienyl catalyst compounds and the ionizing, anion precursor compounds decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an olefinically or acetylenically unsaturated monomer during polymerization. Additionally, the anions useful in this invention will be large or bulky in the sense of sufficient molecular size to partially inhibit or help to prevent neutralization of the metallocene cation by Lewis bases other than the polymerizable monomers that may be present in the polymerization process. Typically the anion will have a molecular size of greater than or equal to about 4 angstroms.

Descriptions of ionic catalysts, those comprising a transition metal cation and a non-coordinating anion, suitable for coordination polymerization appear in the early work in U.S. Pat. Nos. 5,064,802, 5,132,380, 5,198,401, 5,278,119, 5,321,106, 5,347,024, 5,408,017, WO 92/00333 and WO 93/14132. These teach a preferred method of preparation wherein metallocenes (including monoCp metallocenes) are protonated by an anion precursors such that an alkyl/hydride group is abstracted from a transition metal to make it both cationic and charge-balanced by the non-coordinating anion.

The use of ionizing ionic compounds not containing an active proton but capable of producing both the active metallocene cation and an noncoordinating anion is also known. See, EP-A-0 426 637, EP-A-0 573 403 and U.S. Pat. No. 5,387,568. Reactive cations other than the Bronsted acids include ferrocenium, silver, tropylium, triphenylcarbenium and triethylsilylium, or alkali metal or alkaline earth metal cations such as sodium, magnesium or lithium cations. A further class of noncoordinating anion precursors suitable in accordance with this invention are hydrated salts comprising the alkali metal or alkaline earth metal cations and a non-coordinating anion as described above. The hydrated salts can be prepared by reaction of the metal cation-non-coordinating anion salt with water, for example, by hydrolysis of the commercially available or readily synthesized LiB(pfp)$_4$ which yields [Li•xH$_2$O] [B(pfp)$_4$], where (pfp) is pentafluorophenyl or perfluorophenyl.

Any metal or metalloid capable of forming a coordination complex which is resistant to degradation by water (or other Bronsted or Lewis Acids) may be used or contained in the anion. Suitable metals include, but are not limited to, aluminum, gold, platinum and the like. Suitable metalloids include, but are not limited to, boron, phosphorus, silicon and the like. The description of non-coordinating anions and precursors thereto of the documents of the foregoing paragraphs are incorporated by reference for purposes of U.S. patent practice.

An additional method of making the ionic catalysts uses ionizing anion precursors which are initially neutral Lewis acids but form the cation and anion upon ionizing reaction with the metallocene compounds, for example tris (pentafluorophenyl) boron acts to abstract a hydrocarbyl, hydride or silyl ligand to yield a metallocene cation and stabilizing non-coordinating anion, see EP-A-0 427 697 and EP-A-0 520 732. Ionic catalysts for coordination polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated by reference for purposes of U.S. patent practice.

When the cation portion of an ionic non-coordinating precursor is a Bronsted acid such as protons or protonated Lewis bases (excluding water), or a reducible Lewis acid such as ferricinium or silver cations, or alkaline metal or alkaline earth metal cations such as those of sodium, magnesium or lithium cations, the transition metal to activator molar ratio may be any ratio, but preferably from about 10:1 to 1:10, more preferably from about 5:1 to 1:5, even more preferably from about 2:1 to 1:2 and most preferably from about 1.2:1 to 1:1.2 with the ratio of about 1:1 being the most preferred.

Since the geminally disubstituted olefins will tend to be polymerized carbocationically independently of the ethylene, and of many other coordination polymerizable monomers, when in the presence of a stable carbocation such as tropylium, triphenylcarbenium, hydrated alkaline metal or alkaline earth metals, or Lewis acids strong enough to liberate a proton from water, for example trispentafluorophenyl) boron, the above ratios are preferred only when the reaction system is essentially free of compounds capable of generating a proton, such as water or alcohols. If trace quantities of these compounds are present, the preferred transition metal compound to activator molar ratio is from 10:1 to 1:1, more preferably from about 5:1 to 1:1, even more preferably from about 2:1 to 1:1 and most preferably from about 1.2:1 to 1:1 with the ratio of 1.05:1 being the most preferred.

When the X ligands are not hydride, hydrocarbyl or silylhydrocarbyl, such as the chloride ligands in dimethylsilyl(tetramethylcyclopentadienyl (phenethylamido)titanium dichloride, and are not capable of discrete ionizing abstraction with the ionizing, anion precursor compounds, the X ligands can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating noncoordinating anion precursor compounds. Accordingly, a preferred catalytically active monocyclopentadienyl, heteroatom-containing Group 4 transition metal catalyst component is a transition metal cation stabilized and counter-balanced with a non-coordinating anion as derived in any of the foregoing methods.

When using ionic catalysts comprising the invention Group 4 metal cations and non-coordinating anions, the total catalyst system will generally additionally comprise one or more scavenging compounds. The term "scavenging compounds" as used in this application and its claims is meant to include those compounds effective for removing polar impurities from the reaction environment. The term will also include proton scavengers to suppress competing carbocationic polymerization, see the description and illustrations of WO 95/29940. Impurities can be inadvertently introduced with any of the polymerization reaction components, particularly with solvent, monomer and catalyst feed, and adversely affect catalyst activity and stability. It can result in decreasing or even elimination of catalytic activity, particularly when a metallocene cation-noncoordinating anion pair is the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of scavenging compound will still normally be used in the polymerization process itself.

Typically the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, isobutyl aluminumoxane, and n-octyl aluminum. Those scavenging compounds having bulky or $C_8$–$C_{20}$ linear hydrocarbyl substituents covalently bound to the metal or metalloid center being preferred to minimize adverse interaction with the active catalyst. When alumoxane is used as activator, any excess over the amount of metallocene present will act as scavenger compounds and additional scavenging compounds may not be necessary. The amount of scavenging agent to be used with metallocene cation-noncoordinating anion pairs is minimized during polymerization reactions to that amount effective to enhance activity.

The catalyst according to the invention may be supported for use in gas phase, bulk, slurry polymerization processes, or otherwise as needed. Numerous methods of support are known in the art for copolymerization processes for olefins, particularly for catalysts activated by alumoxanes, any is suitable for the invention process in its broadest scope. See, for example, U.S. Pat. Nos. 5,057,475 and 5,227,440. An example of supported ionic catalysts appears in WO 94/03056. A particularly effective method is that described in co-pending application U.S. Ser. No. 08/474,948 filed Jun. 7, 1995, now U.S. Pat. No. 5,643,847 and WO 96/04319. A bulk, or slurry, process utilizing supported, bis-cyclopentadienyl Group 4 metallocenes activated with alumoxane co-catalysts is described as suitable for ethylene-propylene rubber in U.S. Pat. Nos. 5,001,205 and 5,229,478, these processes will additionally be suitable with the catalyst systems of this application. Both inorganic oxide and polymeric supports may be utilized in accordance with the knowledge in the field. See U.S. Pat. Nos. 5,422,325, 5,427,991, 5,498,582, 5,466,649, copending U.S. patent aplications 08/265,532 now abandoned and 08/265,533, now abandoned both filed Jun. 24, 1995, and international publications WO 93/11172 and WO 94/07928. Each of the foregoing documents is incorporated by reference for purposes of U.S. patent practice.

In preferred embodiments of the process for this invention, the catalyst system is employed in liquid phase (solution, slurry, suspension, bulk phase or combinations thereof), in high pressure liquid or supercritical fluid phase, or in gas phase. Each of these processes may be employed in singular, parallel or series reactors. The liquid processes comprise contacting the ethylene and geminally disubstituted olefin monomers with the above described catalyst system in a suitable diluent or solvent and allowing said monomers to react for a sufficient time to produce the invention copolymers. Hydrocarbyl solvents are suitable, both aliphatic and aromatic, hexane and toluene are preferred. Bulk and slurry processes are typically done by contacting the catalysts with a slurry of liquid monomer, the catalyst system being supported. Gas phase processes similarly use a supported catalyst and are conducted in any manner known to be suitable for for ethylene homopolymers or copolymers prepared by coordination polymerization. Illustrative examples may be found in U.S. Pat. Nos. 4,543, 399, 4,588,790, 5,028,670, 5,382,638, 5352,749, 5,436,304, 5,453,471, and 5,463,999, and WO 95/07942. Each is incorporated by reference for purposes of U.S. patent practice.

Generally speaking the polymerization reaction temperature can vary from about −50° C. to about 250° C. Preferably the reaction temperature conditions will be from −20° C. to 220°, more preferably below 200° C. The pressure can vary from about 1 mm Hg to 2500 bar, preferably from 0.1 bar to 1600 bar, most preferably from 1.0 to 500 bar. Where lower molecular weight copolymers, e.g., $M_n \leq 10,000$, are sought it will be suitable to conduct the reaction processes at temperatures above about 0° C. and pressures under 500 bar. The multiboron activators of U.S. Pat. No. 5,278,119 can additionally be employed to facilitate the preparation of the low molecular weight copolymers of the invention.

As will be apparent to those skilled in the art the catalyst compounds and components of this invention may be mixed with other catalyst systems or used with series or parallel reactors employing one or more such catalyst systems to prepare polymer blends comprising one or more of invention copolymers or blends of them with other polymers and copolymers with properties associated with such blends, for example, broadened polydispersity for improved processing polymer compositions and improved impact strength polymer blend compositions.

Industrial Applicability

Low molecular weight α-olefin-containing copolymers are known to be useful as petroleum product additives and as components of adhesive and sealant compositions. This is particularly true when functionalization through terminal unsaturation in such copolymers is feasible. And, since petroleum refining produces feedstreams that can be separated by fractionation into those comprising lower carbon number compounds (from 2 to 4 carbons), from those of higher carbon number compounds (five and above), and since the lower carbon number compounds will comprise both α-olefins and isobutylene, the ability to incorporate the isobutylene along with its analogs, 1-butene and 2-butene, contained in those feedstreams is industrially desired. See, for example, WO 93/24539, where isobutylene is apparently used as an unreactive diluent unless a carbocationic catalyst is added with the biscyclopentadienyl metallocene coordination catalysts.

The copolymers of the invention will be useful in low molecular weight embodiments as oleaginous composition modifiers, for example, fuel or lubricating oil additives, particularly when essentially elastomeric and having significant amounts of terminal vinylidene groups. See U.S. Pat. No. 5,498,809 and international publications WO 94/19436 and WO 94/13715 for description of ethylene-1-butene polymers having at least 30% vinylidene termination, and their functionalization into effective dispersants for lubricating oil compositions. Such compositions are said to be suitable replacements in lubricating oil compositions for traditionally used dispersants comprising functionally modified polyisobutylene. See also, EP 0 513 211 B1 where similar copolymers are described in effective wax crystal modifier compositions for use in fuel compositions. All references are incorporated by reference for purposes of U.S. patent practice.

Additional uses will arise in fields traditionally using similar molecular weight ethylene-α-olefin copolymers of at least some ethylene crystallinity, such as linear low density and low density polyethylene copolymers of ethylene with 1-butene, 1-hexene or 1-octene. Films and packaging materials can be prepared from such copolymers by methods well-known in the art. Additionally, adhesive compositions can be prepared using the invention copolymers as replacements for higher α-olefin content copolymers prepared with metallocene catalysts, particularly those described as plastomers because of their elastomeric properties. As known in the art, such copolymers can be used as base polymers that with the addition of tackifier resins, waxes or plasticizers constitute adhesive compositions useful in pressure-sensitive adhesive compositions, hot melt adhesive compositions and the like. See, for example, co-pending U.S. application Ser. Nos. 08/410,656, filed Mar. 24, 1996, U.S. Pat. No. 5,530,054 and 08/406,832, filed Mar. 20, 1995 U.S. Pat. No. 5,548,014 and their International counterparts WO 92/12212 and WO 94/10256, each is incorporated by reference for purposes of U.S. patent practice.

EXAMPLES

In order to illustrate the present invention, the following examples are provided. Such are not meant to limit the invention in any respect, but are solely provided for illustration purposes.

The properties of the polymer were determined by the following test methods:

All molecular weights are weight average molecular weight unless otherwise noted. Molecular weights (weight average molecular weight ($M_w$) and number average molecular weight ($M_n$) were measured by Gel Permeation Chromatography, unless otherwise noted, using a Waters 150 Gel Permeation Chromatograph equipped with a differential refractive index detector and calibrated using polystyrene standards. Samples were run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III" J. Cazes Ed., Marcel Decker, 1981, page 207, which is incorporated by reference for purposes of U.S. patent practice herein. No corrections for column spreading were employed; however, data on generally accepted standards, e.g. National Bureau of Standards Polyethylene 1475, demonstrated a precision with 0.1 units for $M_w/M_n$ which was calculated from elution times. The numerical analyses were performed using Expert Ease software available from Waters Corporation.

All polymerizations were carried out under nitrogen using anhydrous solvents. Isobutylene and 2-methyl-1-pentene were dried by passing the vapor or liquid through columns packed with barium oxide and, for isobutylene, condensing the gas in a bath cooled to below the boiling point of isobutylene (b.p. ~−10° C.). Ethylene was purchased in 99.9% purity and used as received. Solvent and scavenger, if used, were combined directly into the reaction vessel at ambient pressure and allowed to mix for at least 5 minutes prior to the introduction of isobutylene. Isobutylene was collected as a condensed liquid. A known volume of isobutylene was added to the reactor at a temperature below its boiling point or forced into the reactor with pressure from a pressurized cylinder. Ethylene was added to the reactor as a gas at a predetermined pressure. Propylene was similarly added in Example 18. The 2-methyl-1-pentene was added through a reaction inlet as a liquid. The pressures listed in the tables are differential pressures defined as the difference between the nascent reactor pressure before ethylene addition and the ethylene gauge pressure. Catalysts were activated outside of the reactor in a small volume of toluene (~2 ml) and added to the reactor with back pressure.

$M_n$ values are reported as polystyrene equivalents. $^1$H- and decoupled $^{13}$C-NMR spectroscopic analyses were run in either $CDCl_3$ or toluene-$d_8$ at ambient temperature using a field strength of 250 MHz ($^{13}$C - 63 MHz) or in tetrachloroethane-$d_2$ at 120° C. using a field strength of 500 MHz ($^{13}$C - 125 MHz) depending upon the sample's solubility. Incorporation (mol %) of isobutylene into the copolymers of all examples except 17 and 18 was determined by comparison the integration of the methyl proton resonances with those of the methylene proton resonances using the equation below.

mol % IB=100×(4A)/(6B+2A)

where: A: integration of the methyl resonances B: integration of the methylene resonances
For examples 17 and 18 incorporation was determined by $^{13}$C-NMR.

Examples 1 and 2

Example 2 is described here as an example, Example 1 was run in the same manner except without the proton scavenger. Hexane (20 ml) and 0.04 ml (0.000178 mol) of 2,6-di-tert-butylpyridine (DTBP) were added to the main chamber of the reactor. This was cooled to −20° C. whereupon 20 ml of isobutylene was added. The chamber was sealed and warmed to approximately 28° C. To 2 ml of toluene, 68 mg of dimethylsilyl(pentamethylcyclopentadienyl)(cyclododecylamido)titanium dimethyl and 144 mg of $Ph_3CB(PfP)_4$ were dissolved and reacted. After three minutes, the solution was syringed into the catalyst addition port. The port was opened with nitrogen pressure and was immediately followed with ethylene to raise the reactor pressure an additional 65 psi. Reaction was continued for 10 more minutes. The reactor was then de-pressurized and methanol was added to terminate the polymerization. Polymer was isolated by methanol precipitation. The polymer was washed with additional methanol and dried in vacuo.

Examples 3–6

Polymerizations were run similarly to that described above, except that dimethylanilinium tetrakisperfluorophenylboron was used as the activator.

Examples 7–10

These examples are similar in scope to those described above except for the use of triethylaluminum (TEAL) as a scavenger and the manner in which isobutylene is added to the reactor. A typical example follows. The reactor was charged with 100 ml of hexane and 0.2 ml of a 0.25 wt.% TEAL solution in toluene under nitrogen. This solution was stirred for several minutes. Isobutylene (100 ml) was poured into a stainless steel sample cylinder at −80° C. The cylinder was weighed and warmed to ambient temperature and then vertically connected to the reactor. The nascent pressure in this cylinder was used to force the liquid from the sample cylinder into the solution contained in the sealed reactor. Once transfer was complete, the sample cylinder was removed and re-weighed to determine the efficiency of the transfer. In all cases, transfer was more than 95% complete. The reactor was equilibrated to the desired reaction temperature and maintained at this temperature unless otherwise reported. Catalyst was activated in ~4 ml of toluene (40 mg dimethylsilylpentamethylcyclopentadienyl) (cyclododecylamido)dimethyl titanium and 74 mg dimethylanilinium tetrakisperfluorophenylboron and added to the reactor with a pressurized back wash of hexane. This addition was immediately followed by the addition of ethylene to bring the reactor pressure to 65 psi above the pressure before the additions. Reaction was allowed to proceed for a the reported predetermined time before de-pressurization of the reactor and quenching of the reaction with methanol. Polymer was isolated and purified as before.

TABLE 1

Polymerization Conditions with
Dimethylsilyl (pentamethylcyclopentadienyl) (N-cyclododecylamido) titanium dimethyl

| Example | Temperature (°C.) | Catalyst [cat.], (mol/L) | Activator [act.], (mol/L) | Solvent, volume (ml) | [IB] (mol/L) | Ethylene (psi) | time (min.) | Yield (grams) |
|---|---|---|---|---|---|---|---|---|
| Hexane | | | | | | | | |
| 1 | 21→35 | 0.0039 | D, 0.0039 | 20 | 6.3 | 65 | 10 | 0.95 |
| 2[a] | 27.8→74 | 0.0039 | D, 0.0039 | 20 | 6.3 | 65 | 10 | 4.8 |
| 3[a] | 21→21.4 | 0.0039 | A, 0.0011 | 20 | 6.3 | 65 | 10 | 0.11 |

TABLE 1-continued

Polymerization Conditions with
Dimethylsilyl (pentamethylcyclopentadienyl) (N-cyclododecylamido) titanium dimethyl

| Example | Temperature (°C.) | Catalyst [cat.], (mol/L) | Activator [act.], (mol/L) | Solvent, volume (ml) | [IB] (mol/L) | Ethylene (psi) | time (min.) | Yield (grams) |
|---|---|---|---|---|---|---|---|---|
| 4[a] | 21→21.2 | 0.0011 | A, 0.0011 | 20 | 6.3 | 65 | 6 | 0.05 |
| 5 | 21.3→40 | 0.0039 | A, 0.0039 | 20 | 6.3 | 65 | 5 | 1.7 |
| 6 | 25→28 | 0.0039 | A, 0.0039[d] | 20 | 6.3 | 65 | 5 | 0.7 |
| 7 | ~36 | 0.0018 | A, 0.0018 | 100 | 6.3 | 65 | 10 | 10.0 |
| 8[b] | 36→60 | " | " | " | " | " | 5 | 20 |
| 9[b] | 36 | 0.00046 | A, 0.00046 | " | " | " | 10 | 10.3 |
| 10[b] Toluene | 60 | " | " | " | " | 91 | 10 | 20 |
| 11[c] | −20→−17 | 0.00057 | A, 0.00057 | 30 | 6.3 | 65 | 60 | 1.3 |
| 12[c] | 25→38 | 0.00077 | D, 0.00038 | " | " | " | 10 | 2.5 |
| 13[c] | 24→5 | 0.00057 | MAO, 0.057 | " | " | 20 | 15 | 3.3 |
| 14[c] | 28→34 | 0.00057 | MAO, 0.057 | " | 6.3 | 5 | 135 | 11.0 |

[a][DTBP] = 0.0045 mol/L;
[b][TEAL] = 0.0019 mol/L;
[c][TEAL] = 0.0010 mol/L;
A: dimethylanilinium tetrakisperfluorophenylboron;
D: triphenylmethyl tetrakisperfluorophenylboron;
MAO: methylalumoxane 30 wt. % in toluene; note molarities based on $V_{solvent} + V_{IB}$;
[d]chlorobenzene was used in place of toluene as solvent.

TABLE 2

Polymer Characterization

| Example | GPC $M_n$ | GPC $M_w/M_n$ | GPC modality | PIB wt. % ($^1$H-NMR) | mol % IB in P(E-co-IB) ($^1$H-NMR) | $T_g$ (°C.) | $T_m$ (°C.) | DH (J/g) |
|---|---|---|---|---|---|---|---|---|
| 1 | 8000 | 4.2 | 1 | y | 25 | ND | ND | ND |
| 2 | 760 | 7.1 | 1 | y | 42 | −73 | — | — |
| 3 | — | — | ND | none | 31 | ND | ND | ND |
| 4 | — | — | ND | " | ND | ND | ND | ND |
| 5 | 10,300 | 2.5 | 1 | " | 33 | ND | ND | ND |
| 6 | 12,300 | 2.0 | 1 | " | ND | ND | ND | ND |
| 7 | 26,500 | 2.3 | 1 | " | 24 | ND | ND | ND |
| 8 | 2060 | 6.2 | 2 | " | 31 | ND | ND | ND |
| 9 | 3260 | 6.5 | 2 | " | 11 | ND | ND | ND |
| 10 | 16,670 | 8.5 | 2 | " | 4 | ND | 129 | 122.3 |
| 11 | 48,500 | 1.7 | 1 | " | 31 | −36 | 127 | 4.8 |
| 12 | 8910 | 2.2 | 1 | " | 33 | −36 | 127[e] | 11.0 |
| 13 | 14,500 | 2.0 | 1 | " | 38 | −31 | 111 | ND |
| 14 | 13,200 | 2.5 | 1 | " | 45 | −25 | ND | ND |

[e]$T_{m1}$ = 15.4° C., 0.34 J/g;
ND: not determined

Example 11

This polymerization was run similarly to examples 3–6 except for the use of TEAL as scavenger and a polymerization temperature of −20° C. The polymerization was run for 1 hour.

Example 12

This polymerization was run similarly to examples 1 and 2 except for the use of two molar equivalents of metallocene to one molar equivalent of $Ph_3CB(pfp)_4$.

Examples 13 and 14

These polymerizations were run similarly except for using TEAL as scavenger, methylalumoxane MAO) as activator, and lower ethylene pressure.

Examples 15 and 16

These polymerizations were run similarly to examples 7–10, but with different metallocenes.

Example 17

This polymerization was run similarly to examples 7–10, however, 100 ml of 2-methyl-1-pentene was used in place of isobutylene.

Example 18

Toluene (30 ml) and 0.06 ml of a 1.0M TEAL solution were combined, aged for 5 minutes and cooled to −50° C. At this temperature, 30 ml of liquid isobutylene was added. The reactor was sealed and warmed to 25° C. The pressure of the reactor was increased an additional 5 psi with the addition of ethylene. Separately, 15 mg of dimethylsilyl (tetramethylcyclopentadienyl)(cyclododecylamido)titanium dimethyl was activated with 657 mg of a 30 wt% methylalumoxane solution in toluene. This solution was added to the catalyst chamber and added to the reactor with nitrogen back pressure. Immediately, the pressure was raised an additional 20 psi with propylene addition. The reaction was continued for 15 minutes. The reactor was depressurized and the reaction quenched with methanol. Polymer was isolated with methanol precipitation. Yield: 2.0 grams. The terpolymer had a $M_n$ of 7770 and a $M_w/M_n$ of 3.4. A $^{13}$C-NMR (62.5 MHz) spectrum revealed that the terpolymer consisted of 76 mol % propylene, 13 mol % ethylene and 11 mol % isobutylene.

Example B

Chlorobenzene (40 ml) and 20 ml of isobutylene were combined into the reaction chamber at −20° C. The reactor was sealed and pressurized to 40 psi with ethylene. Separately, 12 mg (0.00003 mol) of bis (pentamethylcyclopentadienyl)zirconium dimethyl and 28 mg of triphenylmethyl tetrakisperfluorophenylboron were reacted together in 2 ml of chlorobenzene. This solution was placed into the catalyst addition port and added to the reactor

TABLE 3

Polymerization Conditions with other Mono-CpTi

| Example | Temperature (°C.) | Catalyst [cat.], (mol/L) | Activator [act.], (mol/L) | Hexane, volume (ml) | [IB] (mol/L) | Ethylene (psi) | time (min.) | Yield (grams) |
|---|---|---|---|---|---|---|---|---|
| 15 | 60 | Q, 0.00070 | A, 0.00046 | 100 | 6.3 | 91 | 5 | 32.5 |
| 16 | 60 | F, 0.00046 | A, 0.00046 | 100 | 6.3 | 91 | 10 | 2.74 |
| 17 | 60 | F, 0.00046 | A, 0.00046 | 100 | 2.0* | 91 | 10 | 3.8 | for all runs [TEAL] = 0.0019 mol/L;
Q: dimethylsilyl(methylcyclopentadienyl)(t-butylamido)dimethyltitanium;
F: dimethylsilyl (methylcyclopentadienyl)(cyclododecylamido) titaniumdimethyl;
*concentration of 2-methyl-1-pentene.

TABLE 4

Isobutylene/Ethylene Copolymerizations
Polymer Characterization

| Example | $M_n$ | $M_w/M_n$ | modality | PIB wt. % | mol % IB in P(E-co-IB) ($^1$H-NMR) | $T_g$ (°C.) | $T_m$ (°C.) | DH (J/g) |
|---|---|---|---|---|---|---|---|---|
| 15 | 13,760 | 4.8 | 1 | none | 1.0 | ND | 127 | 148 |
| 16 | 5600 | 3.91 | 1 | " | 4.0 | ND | ND | ND |
| 17 | 10,780 | 5.86 | 1 | " | 9.0* | ND | ND | ND |

ND: not determined;
*mol % of 2-methyl-1-pentene incorporation by $^{13}$C-NMR

Example 19

This polymerization was run similarly to examples 7 to 10 except that 13 mg of dimethylsilyl (tetramethylcyclopentadienyl)(tert-butylamido)zirconium dimethyl was used and activated with 27 mg of dimethylanilinum tetrakisperfluorophenylboron. A differential pressure of 91 psi of ethylene was used with a reactor temperature of 60° C. Polymerization was stopped after 30 minutes to produce 41.76 g of copolymer. $^1$H-NMR (250 Mhz) spectrum of this copolymer revealed that the copolymer contained 2.4 mol % isobutylene.

The following examples are given as comparative examples.

Example A

This polymerization was run similarly to example 13 except for higher ethylene pressure and a change in the metallocene. Toluene (30 ml) and 0.06 ml of a 1.0M TEAL solution were combined in the reaction chamber and aged five minutes. The reactor was cooled to −20° C., whereupon 30 ml of isobutylene was added. The reactor was sealed and warmed to 25° C. Ethylene was added to 40 psi. Separately, 7 mg (0.00024 mol) of pentamethylcyclopentadienyl titanium trichloride was activated in 484 mg (0.0025 mol Al) of a 30 wt.% MAO solution in toluene. The activated catalyst solution was pressurized into the reactor with 65 psi of ethylene. Reaction was continued for 15 minutes. No polymerization was observed.

with 60 psi nitrogen back pressure. The reaction exothermed to 35° C. Reaction continued for 30 minutes. The vessel was de-pressurized and methanol added to end the reaction. Polymer was isolated by methanol precipitation. The product (1.4 grams) was analyzed by $^1$H-NMR to be a blend of polyethylene and polyisobutylene.

Example C

Toluene (30 ml) and 0.06 ml of a 1.0M TEAL solution in hexanes were combined and aged 5 minutes. This solution was cooled to −80° C., whereupon 30 ml of isobutylene was added. The reactor was sealed and warmed to 25° C. Separately, 10 mg of dimethylsilyl-bis(tetrahydroindenyl) zirconium dimethyl was dissolved into 2 ml of toluene and activated with 500 mg of a 30 wt.% methylalumoxane solution in toluene. The activated catalyst solution was added to the catalyst addition port of the reactor. The catalyst was added to the reactor with nitrogen back pressure. Ethylene was immediately added to add an additional 40 psi to the reactor pressure. The reaction was continued for 25 minutes. The polymerization was stopped by de-pressurizing the reactor and quenching with methanol. The polymer was isolated by filtration and washed with methanol before drying in vacuo. This polymer contained 0.5 mol. % isobutylene. Yield: 0.75 grams.

We claim:

1. A substantially random ethylene copolymer derived from ethylene and at least one geminally disubstituted olefin monomer comprising from about 11 mole percent to about 50 mol % of the at least one geminally disubstituted olefin monomer.

2. The copolymer of claim 1 wherein said at least one geminally disubstituted olefin monomer has the generic formula $$R_1=R_2(R_3)(R_4),$$

where $R_1$ is $CH_2$, $R_2$ is C, and $R_3$ and $R_4$ are, independently, hydrocarbyl groups having from 1 to 20 carbon atoms and containing one carbon atom bound directly to $R_2$.

3. The copolymer of claim 1 having terminal vinylidene unsaturation.

4. The copolymer of claim 1 having a number-average molecular weight of from 300 to 100,000.

5. The copolymer of claim 3 having a number-average molecular weight of from 300 to 10,000.

6. The copolymer of claim 1 additionally comprising at least one coordination polymerizable monomer other than ethylene and said at least one geminally disubstituted olefin monomer.

7. The copolymer of claim 1 wherein said geminally disubstituted olefin monomer is isobutylene or 2-methyl-1-pentene.

8. The copolymer of claim 2 wherein said geminally disubstituted olefin monomer is isobutylene or 2-methyl-1-pentene.

9. The copolymer of claim 6 wherein said at least one coordination polymerizable monomer is selected from the group consisting of: $C_3$ and higher α-olefins, styrene and hydrocarbyl-substituted styrene monomers wherein the substituent is on the aromatic ring, $C_6$ and higher substituted α-olefins, $C_4$ and higher internal olefins, $C_4$ and higher diolefins, $C_5$ and higher cyclic olefins and diolefins, and acetylenically unsaturated monomers.

10. The copolymer of claim 6 wherein said at least one coordination polymerizable monomer is selected from the group consisting of propylene, 1-butene, 1-pentene, 1-hexene, 1-heptene, 1-octene, 1-nonene, 1-decene, 1-dodecene, 4-methyl-1-pentene, 5-methyl-1-nonene, 3-methyl-1-pentene, 3,5,5-trimethyl-1-hexene, vinylcyclohexane, styrene, paramethylstyrene, ethylidene-2-norbornene, vinylcyclohexene, 5-vinyl-2-norbornene, norbornene, and alkyl-substituted norbornenes.

11. The copolymer of claim 6 wherein said at least one coordination polymerizable monomer is selected from the group consisting of propylene, 1-butene, 1-hexene, 1-octene, styrene, and norbornene.

* * * * *

UNITED STATES PATENT AND TRADEMARK OFFICE
CERTIFICATE OF CORRECTION

PATENT NO. : 5,866,665

DATED : February 2, 1999

INVENTOR(S) : Timothy Daniel Shaffer, et al

Page 1 of 2

It is certified that error appears in the above-identified patent and that said Letters Patent is hereby corrected as shown below:

TITLE (54) FRONT PAGE OF PATENT: Delete "GERMINALLY" and replace with --GEMINALLY--.

Col. 1, Line 2 delete "GERMINALLY", replace with --GEMINALLY--.

Col. 1, Line 10 delete "seminally", replace with --geminally--.

Col. 6, Line 30 delete "CP" (contained in formula), replace with --Cp--.

Col 7, Line 33 delete "tetramethylydopentadienyl" replace with --tetramethylcyclopentadienyl--.

Col. 7, Line 34 delete "cycldodecyloamido" replace with --cyclododecylamido--.

Col. 7, Line 35 delete "tetramethyleydopentiadienyl replace with -- tetramethylcyclopentadienyl--.

UNITED STATES PATENT AND TRADEMARK OFFICE
CERTIFICATE OF CORRECTION

PATENT NO. : 5,866,665
DATED : February 2, 1999
INVENTOR(S) : Timothy Daniel Shaffer, et al.

It is certified that error appears in the above-identified patent and that said Letters Patent is hereby corrected as shown below:

Col. 7, Line 38 delete "tetramethycydopentiadienyl" replace with -- tetramethylcyclopentadienyl--.

Col. 14, Line 45 delete dimethylsilylpentamehtylcyclopentadienyl" replace with --dimethylsilyltetramethylcyclopentadienyl--.

Signed and Sealed this

Twenty-first Day of September, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,866,665
DATED : February 2, 1999
INVENTOR(S) : Timothy Daniel Shaffer, et al.

It is certified that error appears in the above-identified patent and that said Letters Patent is hereby corrected as shown below:

Col. 14, line 6-7, delete "dimethylsilypentamethylcyclopentadienyl" replace with --dimethylsilytertramethylcyclopentadienyl--.

Signed and Sealed this

Seventh Day of March, 2000

Attest:

Q. TODD DICKINSON

Attesting Officer

Commissioner of Patents and Trademarks